Sept. 18, 1962 R. F. SHOUP ET AL 3,054,557
VOTING MACHINE
Filed Jan. 26, 1960 9 Sheets-Sheet 1

INVENTORS.
RANSOM F. SHOUP
EDWARD A. FOX, SR.
BY Louis Necho
ATTORNEY.

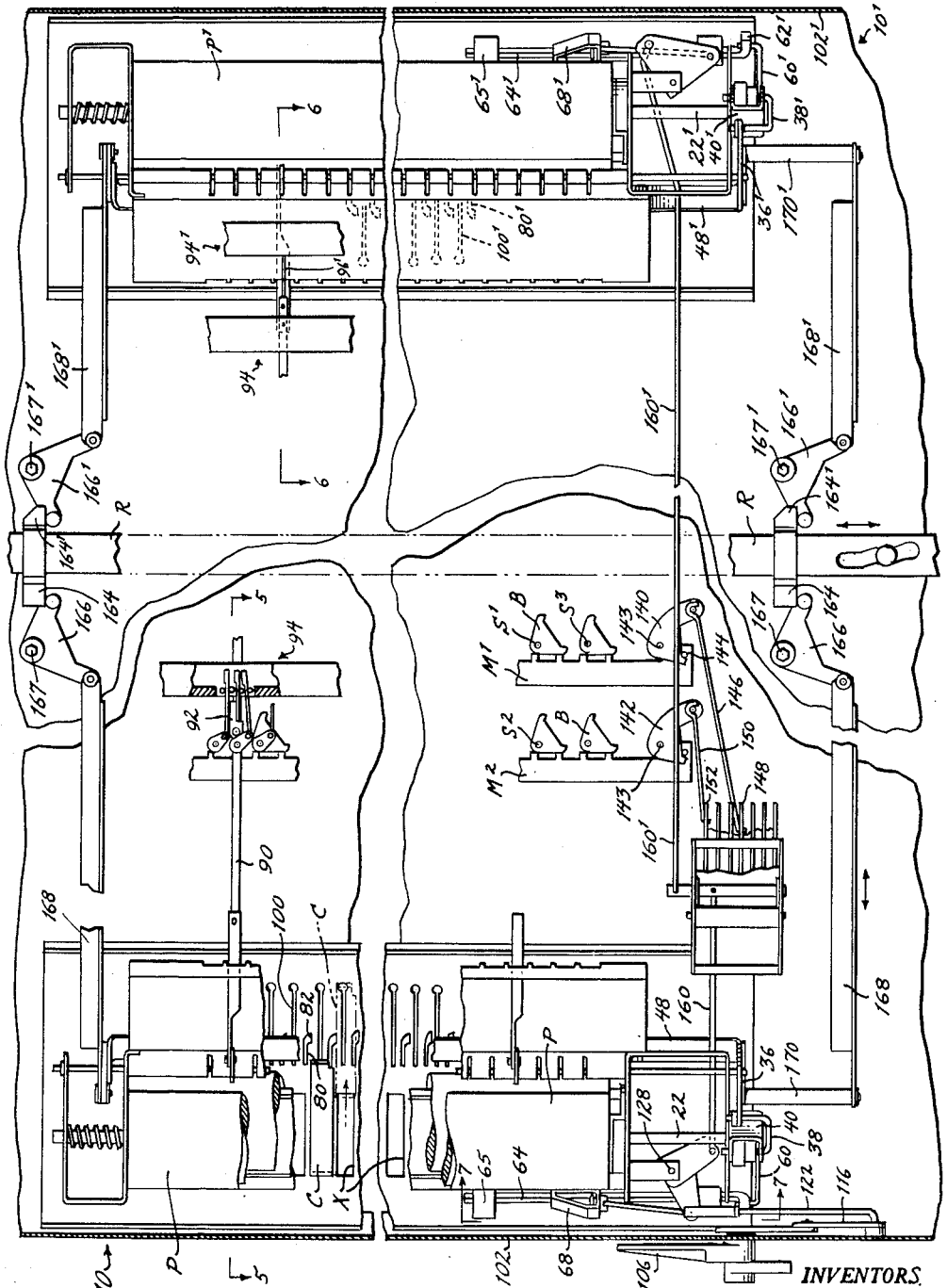

INVENTORS.
RANSOM F. SHOUP
EDWARD A. FOX, SR.
ATTORNEY.

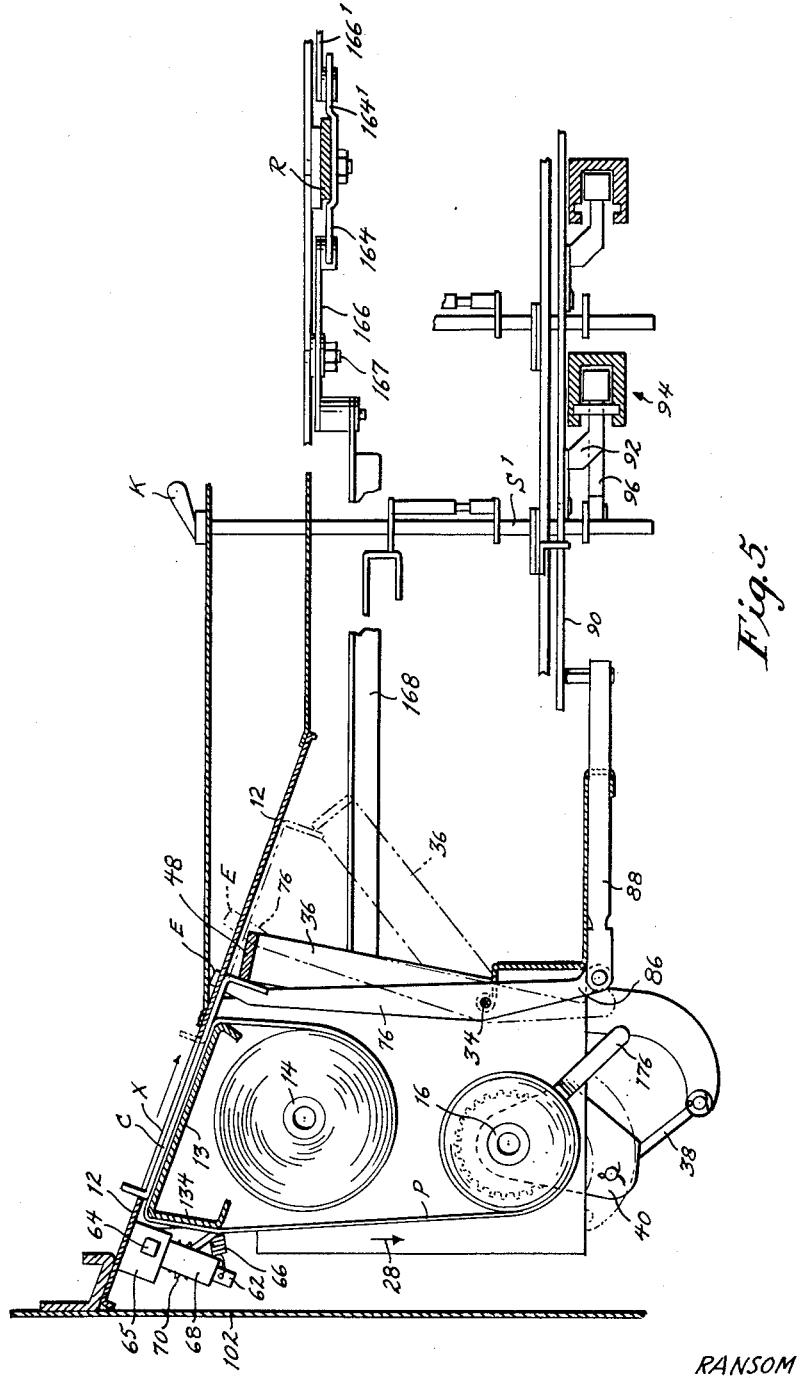

Sept. 18, 1962 R. F. SHOUP ET AL 3,054,557
VOTING MACHINE
Filed Jan. 26, 1960 9 Sheets-Sheet 5

INVENTORS
RANSOM F. SHOUP
EDWARD A. FOX, SR.
BY
ATTORNEY

Sept. 18, 1962     R. F. SHOUP ET AL     3,054,557
VOTING MACHINE
Filed Jan. 26, 1960     9 Sheets-Sheet 6
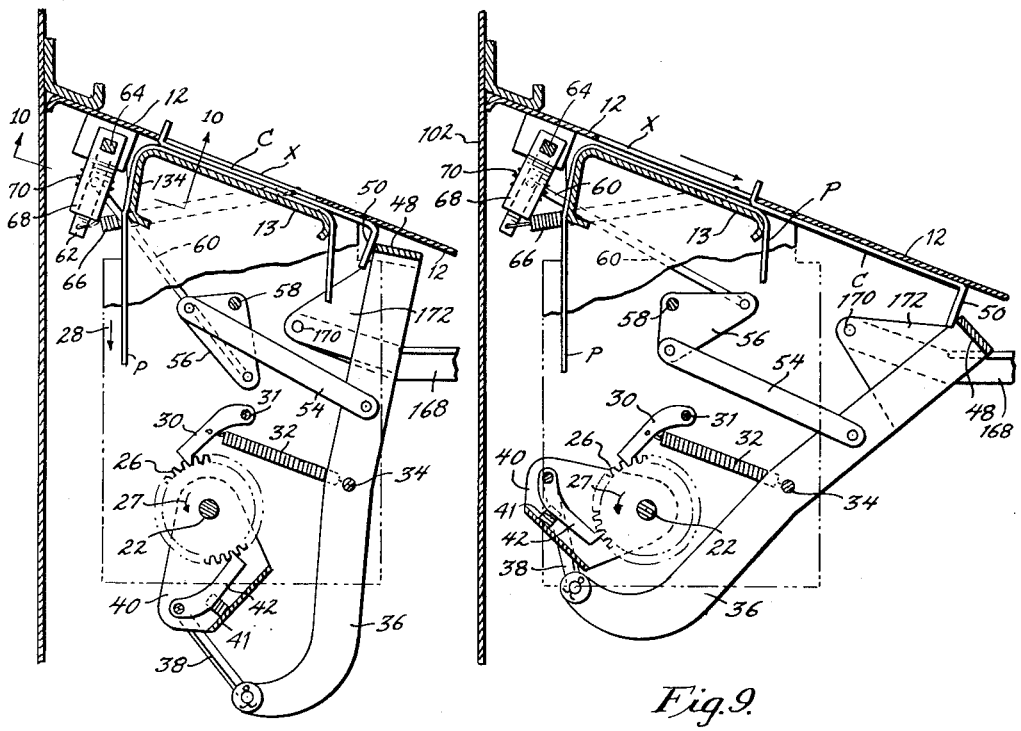
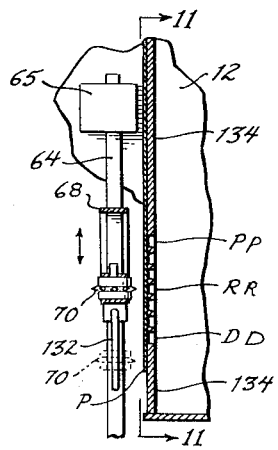
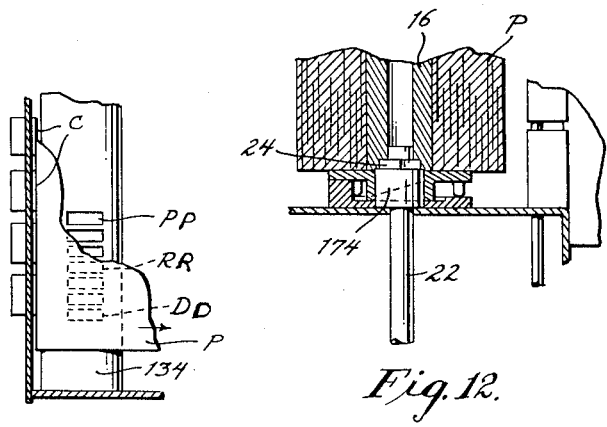
INVENTORS.
RANSOM F. SHOUP
EDWARD A. FOX, SR.
BY
ATTORNEY.

Sept. 18, 1962   R. F. SHOUP ET AL   3,054,557
VOTING MACHINE
Filed Jan. 26, 1960   9 Sheets-Sheet 8

INVENTORS.
RANSOM F. SHOUP
BY EDWARD A. FOX, SR.

ATTORNEY.

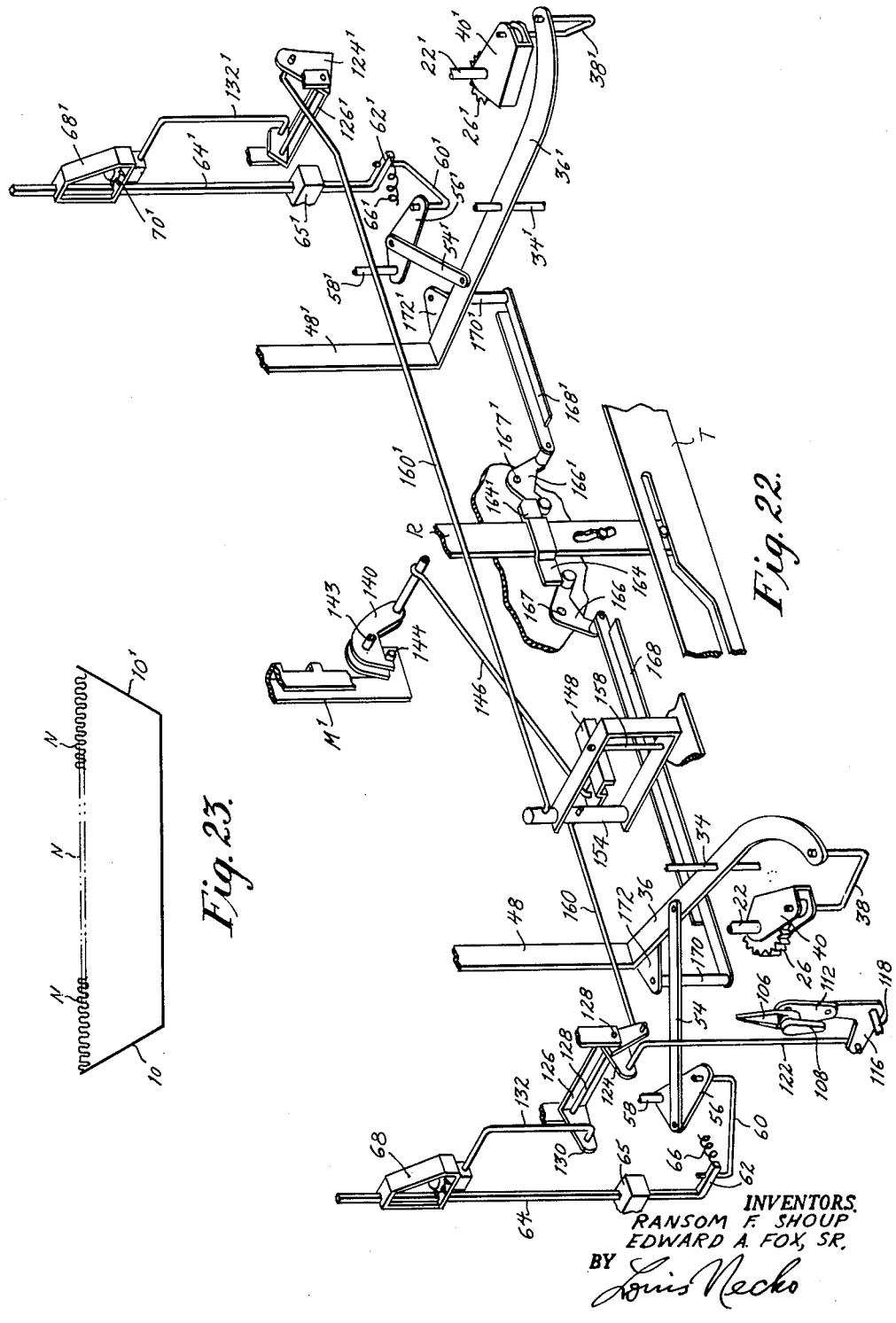

United States Patent Office

3,054,557
Patented Sept. 18, 1962

3,054,557
VOTING MACHINE
Ransom F. Shoup, Bryn Mawr, and Edward A. Fox, Sr., Morton, Pa., assignors to Shoup Research and Development Co., Crumlyn, Pa., a corporation of Pennsylvania
Filed Jan. 26, 1960, Ser. No. 4,802
9 Claims. (Cl. 235—50)

Our invention relates to a voting machine of the type disclosed in Shoup Patent Nos. 2,054,102 and 2,266,857; 2,251,254 and 2,826,365.

One object of the invention is to produce an improved machine of the type set forth.

In primary elections, the voters of each party select the candidate, or candidates, who will represent their respective parties in the final election. Since the winning candidates for a given office in a primary election will contest the same office in the final election, it is necessary to know, for example, that candidate Doe was selected by Democratic votes and that candidate Roe was selected by Republican votes so that candidates Doe and Roe may appear on the Democratic and Republican tickets, respectively, in the final election.

In a "declared" primary election, the voter must give the name of his party and the election officer adjusts the machine so as to lock out the voting facilities of all parties other than that to which the voter belongs. In a "selective" primary, the voter does not give the name of his party, but the machine is so arranged that, if the voter turns the voting spindle assigned to a candidate running for the office of mayor on the ticket of one party, the voting spindles assigned to other candidates running for the same office on the ticket of other parties, are locked out. In either case, the party to which the voter belongs will be automatically indicated.

In certain jurisdictions, the election laws permit a voter to vote for a candidate sponsored for one office by one political party and to vote for a candidate sponsored by another party for another office, or for that matter, to vote for a candidate who is not sponsored by any party. To this end, a paper ballot is provided on which the voter can write the name of his personal choice candidate. But, since the candidates who win in the primary election will be voted on in the final election, it is necessary to know by the voters of which party a given personal choice candidate was selected so that said candidate will be placed on the ticket of said party, or on a non-partisan ticket, in the final election.

It is, therefore, a further object of the invention to produce a voting machine which includes improved means for recording the political party of a voter who casts a write-in, or personal choice, vote.

These and other objects are attained by this invention as set forth in the following specification and the accompanying drawings in which.

Figure 4A:
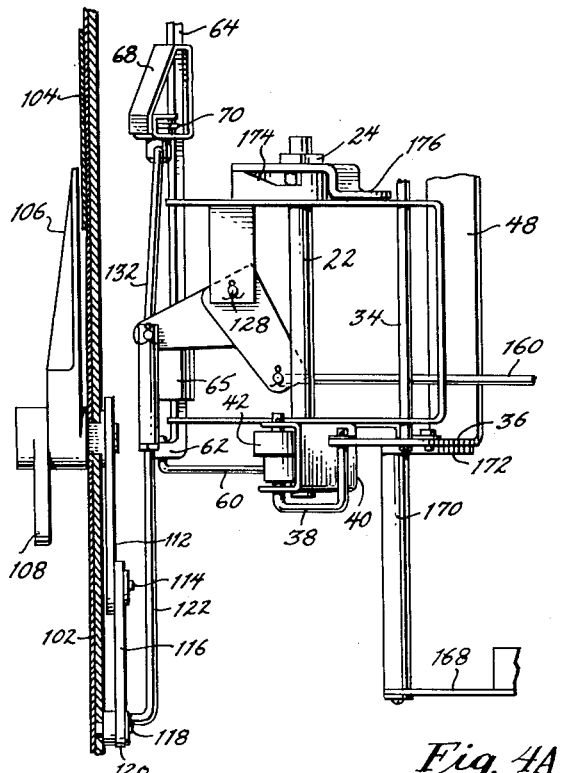
FIG. 4 is a fragmentary and diagrammatic rear elevational view of the voting machine shown in FIG. 1, certain parts being omitted and other parts being broken away to show details of construction.
Figure 4B:
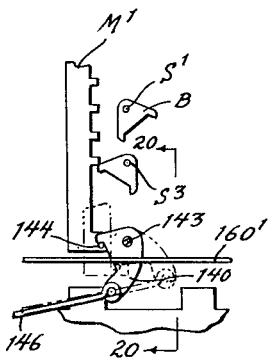

FIG. 4-A is an enlargement of the lower left hand corner of FIG. 4.

FIG. 4-B is a sectional view showing details of construction.

FIG. 5 is an enlarged horizontal sectional view looking in the direction of line 5—5 on FIG. 4.

Figure 6:
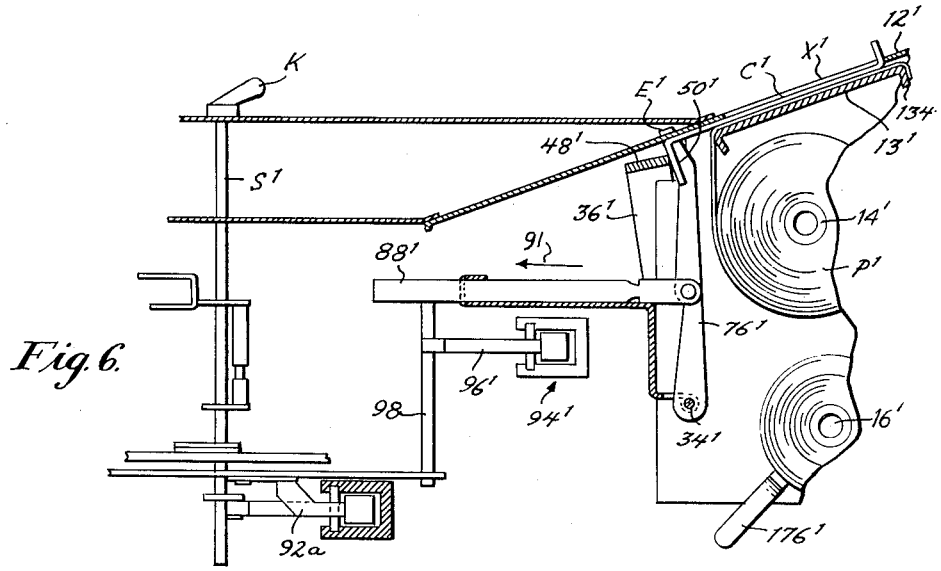

FIG. 6 is an enlarged fragmentary view looking in the direction of line 6—6 on FIG. 4.

Figure 7:
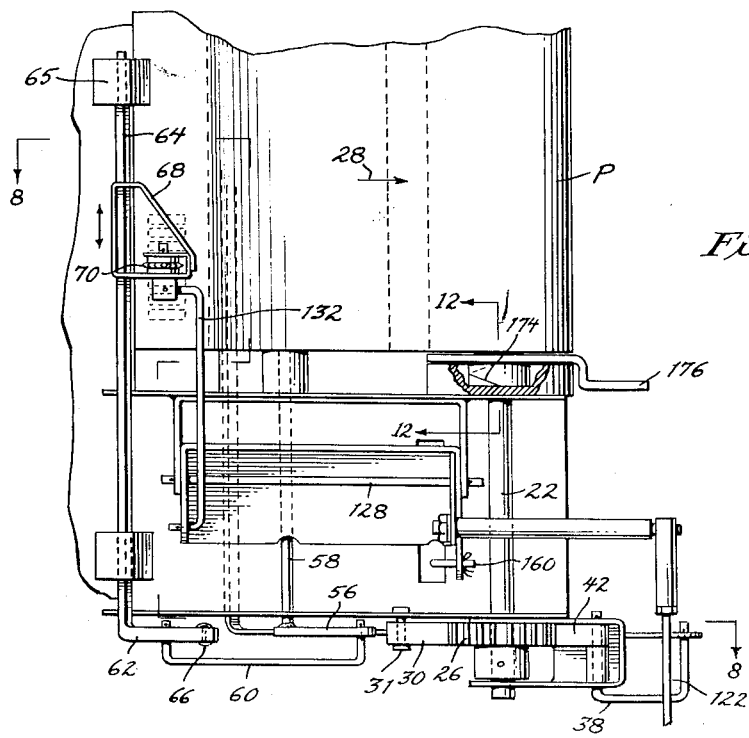

FIG. 7 is an enlarged view partly in section and partly in elevation on line 7—7 on FIG. 4.

FIG. 8 is an enlarged horizontal sectional view looking in the direction of line 8—8 on FIG. 7 and showing the parts in one extreme position.

Figure 9A:
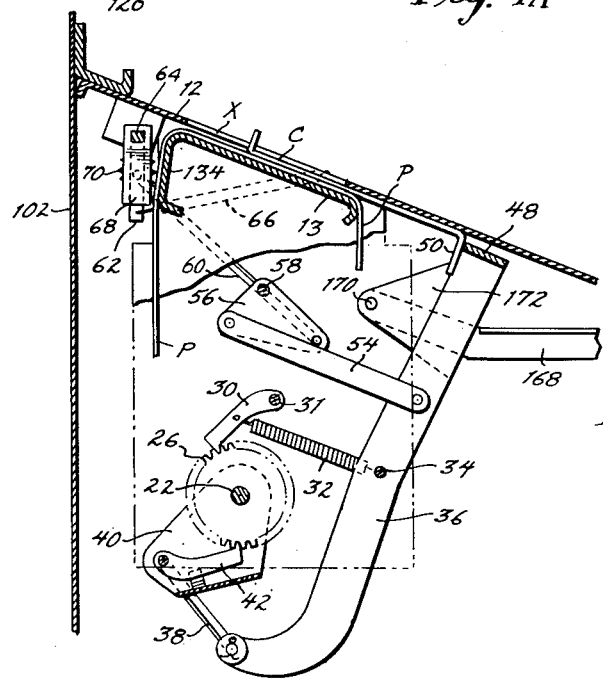

FIG. 9 is a view similar to FIG. 8 but showing the parts in the opposite extreme position.

FIG. 9-A is similar to FIGS. 8 and 9 but showing the same parts in their intermediate position.

FIG. 10 is an enlarged fragmentary sectional view looking in the direction of line 10—10 on FIG. 8.

FIG. 11 is a sectional view looking in the direction of line 11—11 of FIG. 10.

FIG. 12 is a sectional view looking in the direction of line 12—12 of FIG. 7.

Figure 13:
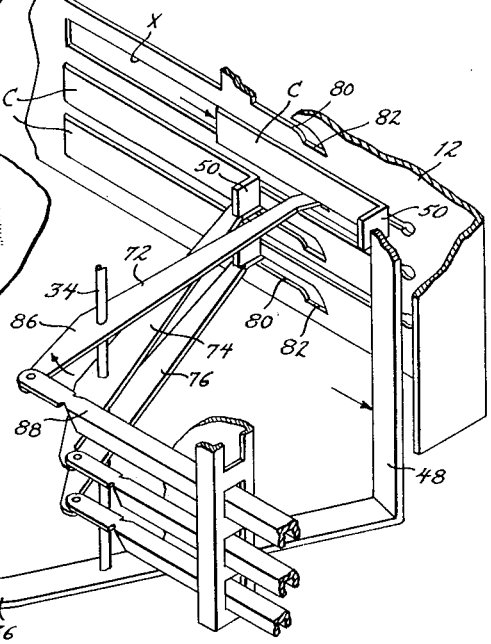

FIG. 13 is a fragmentary perspective view showing details of some of the linkage used in carrying out the invention, the same being viewed from the front side of the machine.

Figure 14:
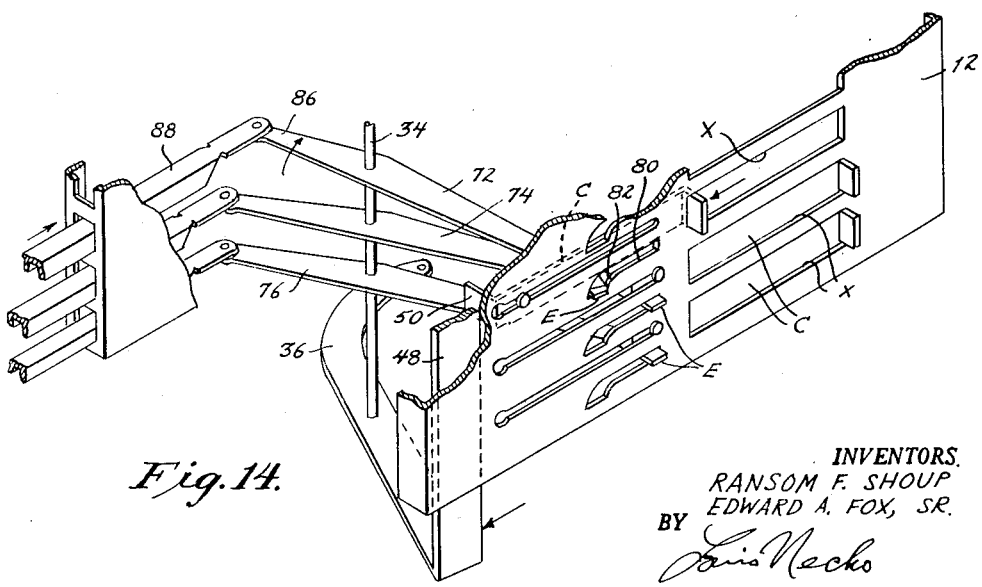

FIG. 14 shows the parts shown in FIG. 13 as viewed from the rear of the machine.

Figure 15:
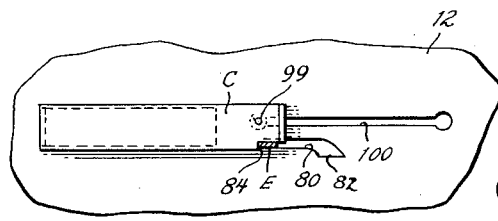
Figure 16:
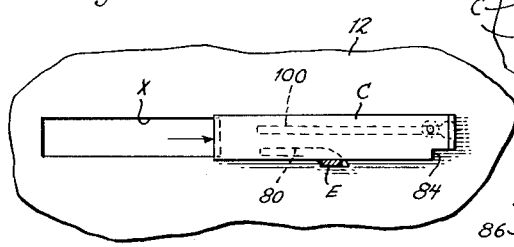

FIGS. 15 and 16 are fragmentary elevational views showing two positions of one of the parts shown in FIGS. 13 and 14.

Figure 17:
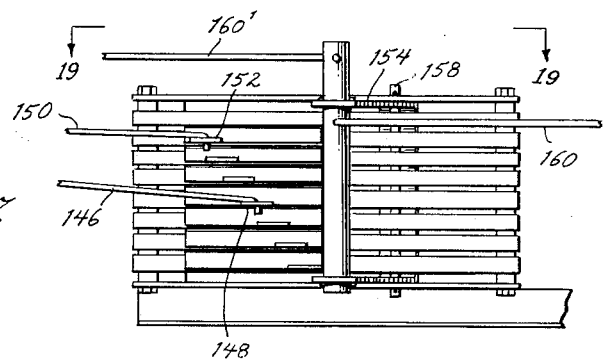

FIG. 17 is an enlarged fragmentary elevational view showing details of construction.

Figure 18:
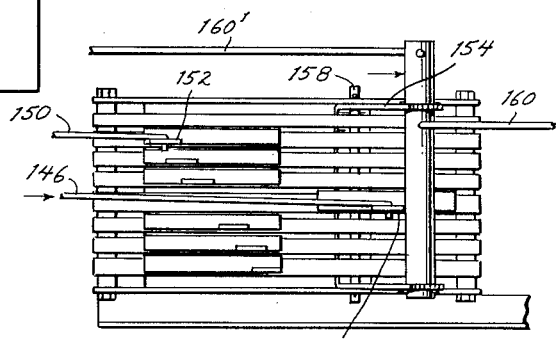

FIG. 18 is similar to FIG. 17 but showing some of the parts in a different position.

Figure 19:
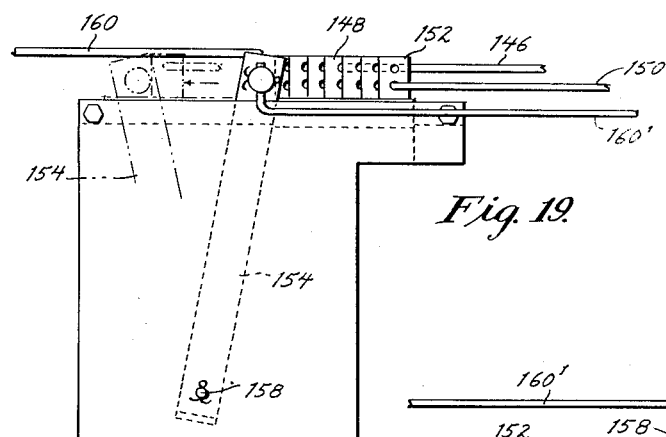

FIG. 19 is a top plan view looking in the direction of line 19—19 on FIG. 17.

Figure 20:
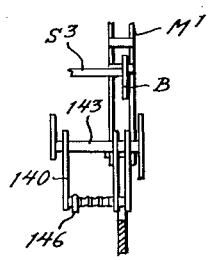

FIG. 20 is an elevational view looking in the direction of line 20—20 on FIG. 4-B.

Figure 21:
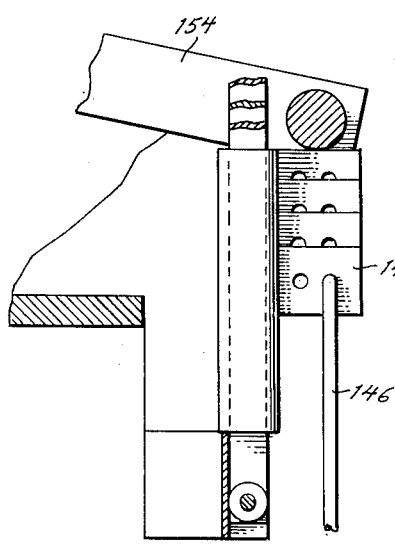

FIG. 21 is a fragmentary view, partly in section and partly in top plan view showing details of construction.

FIG. 22 is a diagrammatic perspective view showing the operating linkage used in carrying out the invention.

FIG. 23 is a reduced, diagrammatic and fragmentary top plan view of a voting machine of the type referred to.

Except as hereinafter set forth, the voting machine embodying this invention may be of the type shown in the Shoup patents referred to or of the types shown in other Shoup patents, copies of which are available in the U.S. Patent Office, and to which reference may be had for the structure and operation of such parts of the machine as are not hereinafter specifically described. For the purpose of this disclosure, it is enough to point out that the voting machine includes a number of vertical columns of voting spindles S-1, S-2, S-3, etc. (FIG. 4) which are rotatable by keys K which are accessible from the front side of the machine (FIG. 1); that the spindles carry butterfly cams B which, upon rotation in vote casting direction, engage and raise associated spindle return member M-1, M-2, etc. (which correspond to channels 66 of Shoup Patent No. 2,251,254; that the front of the machine is closed by a curtain N while a voter is voting, and vice versa; that spindle return members M-1, M-2, etc., are connected for joint movement with vertical rod R (which corresponds to "bar 54" of the last mentioned Shoup patent), and that the curtain is moved to closed, or to open, position by reciprocation of the main cam bar T of the machine (which corresponds to the cam bar which is designated by reference numeral 58 in the last mentioned Shoup patent). Since the structure and operation of these, and other parts of the machine, are clearly described in the Shoup patents referred to, it is only necessary, for the purpose of this disclosure, to assume that the machine is provided with a curtain, or other closure N (FIG. 23) which is opened (as disclosed in the Shoup patents) to admit a voter and which is closed to give privacy while the voter is voting; that opening the curtain resets machine for use by the next voter and locks it; that closing the curtain releases the machine for use by the voter; that the spindle return members M-1, M-2, move up when an associated voting spindle is turned in vote-casting direction; that rod R moves up when the main cam bar T is moved in curtain closing direction, or to the position of FIG. 22; that return members M-1, M-2, etc., and rod R, move downwardly when the main cam bar is moved in curtain opening direction or to the right, as viewed in FIG. 22, and that cam bar T cannot be moved to curtain opening position unless at least one voting spindle has been turned to, and left in, vote casting position, even if said spindle is "blank," that is, unassigned to any candidate. In FIGS. 4 and 22, the machine is shown in the curtain closed position, that is to say, with rod R in its upper position and before any spindle has been turned in vote-casting direction, that is to say, with the spindle return members, M-1, M-2, etc., in their lower position.

Figure 1:
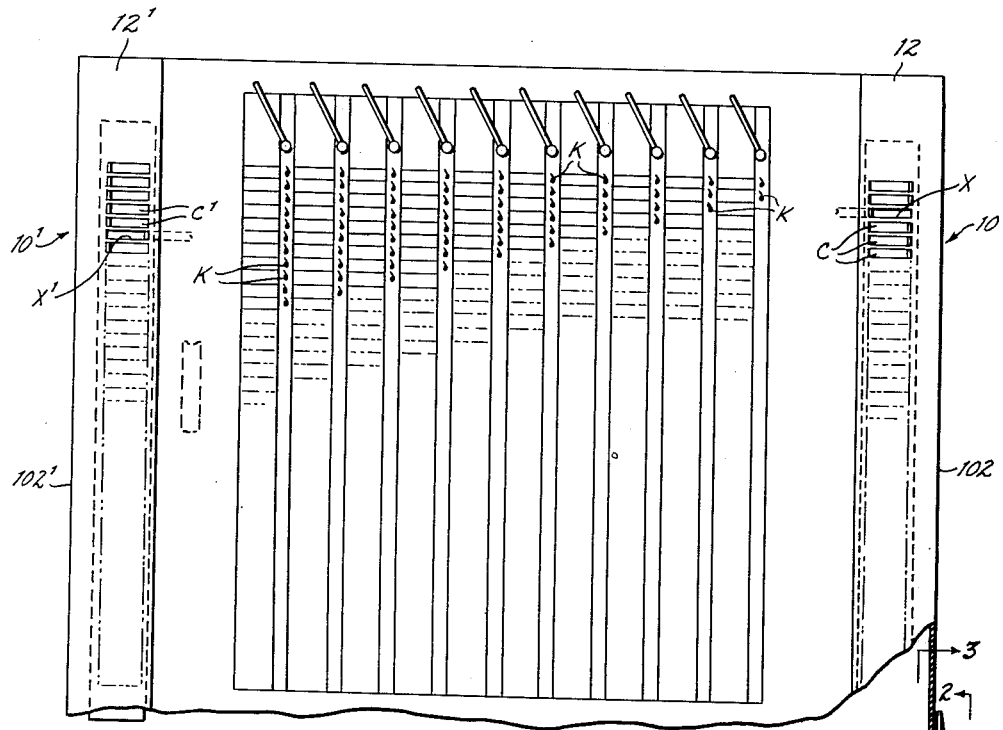
FIG. 1 is a diagrammatic elevational view looking at the front side of the machine, that is the side which is available to a voter using the machine.

As will be seen from FIG. 1, the machine includes two personal choice columns 10 and 10' which are disposed on opposite sides of the central panel which carries the mechanical voting facilities of the machine and which include vertically aligned openings X and X' formed in vertical walls 12 and 12' of the machine. Openings X and X' are normally closed by freely slidable covers C and C' which must be moved out of registration with their openings to permit the voter to write the name of a candidate on paper ballots P and P' which are accessible through said openings. The personal choice columns also include vertical plates 13 and 13' which, as shown in FIGS. 5, 6, 8 and 9, back up the paper ballots P and P' while the voter is writing on the portion of the ballot which is accessible through one or another of openings X and X'. The ballot paper P and P' passing between wall 12 and plate 13 and between wall 12' and plate 13', respectively, come from feed rolls 14 and 14' and are wound on take-up rolls 16 and 16'. Feed rolls 14 and 14' need only be mounted for free rotation in paper unwinding direction in response to winding, or take-up, rotation of rolls 16 and 16' and therefore the mounting of rolls 14 and 14' is not shown or described.

Except for left and right operation, the mechanisms for winding the paper ballots on take-up rolls 16 and 16' after the casting of each write-in, or personal choice, vote, are the same and, therefore, only the mechanism for operating take-up roll 16 will be described and such parts of the mechanism which operate roll 16' as are shown, are designated with the prime of the reference characters used to designate the same parts of the mechanism which operates roll 16.

The mechanism for operating take-up roll 16 is best shown in FIGS. 8, 9, 12 and 22 and includes a shaft 22, the upper, squared end 24 of which detachably engages a square socket in the bottom of roll 16, and the lower end of which is secured to a gear 26 whereby, when the gear is rotated in counterclockwise direction, or in the direction of arrow 27, in FIGS. 8, 9, it will turn spool 16 in paper winding, or take-up direction, or in the direction of arrow 28 in FIG. 5. Gear 26 is retained against clockwise rotation, as viewed in FIGS. 8 and 9, by a dog 30 which is pivoted at 31 and is biased into engagement with the gear by a spring 32 which is anchored to vertical rod 34 which is hereinafter referred to. Gear 26 is rotated by means of lever 36 which is also pivoted on rod 34 and one end of which carries an inverted bail 38, which is connected to bracket 40, FIG. 22, and which rotates freely on shaft 22. Bracket 40 carries a pawl 42, FIGS. 8 and 9, which is suitably biased into constant engagement with gear 26 by spring 41. By this arrangement, movement of lever 36 from the position of FIG. 8 to the position of FIG. 9, sets or triggers, pawl 42, that is, it moves the pawl in clockwise direction relative to the gear. Conversely, movement of lever 36 from the position of FIG. 9 to the position of FIG. 8, rotates gear 26 and, hence, take-up roll 16, in the direction of arrow 27 in FIG. 8, to move the paper P in the direction of arrow 28 in FIG. 5. Lever 36 is provided with a vertical extension arm 48, FIG. 22, which, as will be seen from FIGS. 8 and 9, is disposed in the path of movement of pendent flanges 50 of covers C so that movement of any cover C from the position of FIG. 8, in which the corresponding opening X is closed, to the position of FIG. 9, in which the cover is out of registration with said opening, will engage flange 50 with arm 48 and will rotate lever 36 from the position of FIG. 8 to the position of FIG. 9. The manner in which lever 36 is moved from the position of FIG. 9 to the position of FIG. 8, to rotate gear 26, and roll 16 in paper take-up direction, will be hereinafter described.

Lever 36 is also connected by link 54 to a bell crank 56 which is pivoted at 58 and connected by inverted bail 60 to the foot 62, FIG. 22, of a vertical rod 64 which is mounted in a support 65. Rod 64 is rotatable about its vertical axis and is normally biased for rotation in counterclockwise direction as viewed in FIGS. 8 and 22, by spring 66. Rod 64 slidably carries a bracket 68 which carries a freely rotatable pricker wheel 70, which, when rod 64 is rotated about its vertical axis, and in clockwise direction, as viewed in FIGS. 8 and 9, moves into contact with, and perforates the adjacent paper ballot in the manner shown in FIG. 9-A. By comparison of FIGS. 8, 9 and 9-A, it will be seen that, when all of the covers are in either of the fully closed positions of FIG. 8, or in the fully opened position of FIG. 9, pricker 70 is out of engagement with the paper ballot P and that as lever 36 is moved by any cover C, between the extreme positions of FIGS. 8 and 9, links 54 and 60 pass through the intermediate position of FIG. 9-A to move end 61 of bail 60 out of the path of foot 62 of rod 64 so as to permit spring 60 to turn rod 64 and bring pricker 70 into engagement with the paper ballot moving from spool 14 to spool 16 to perforate the paper for a purpose hereinafter set forth.

In a primary election, be it declared or selective, the voter may vote for only one of a number of candidates running for a given office, if the office is to be filled by a single official, such as a governor, or a treasurer, and the voter may vote for more than one candidate where the office is to be filled by a number of officials, such as two or more members of the legislature or two or more members of a city council, etc. In either case, it is necessary to make it impossible for the voter to vote for more than one candidate, or set of candidates, for the same office. In the machine disclosed in the Shoup patents referred to, this is accomplished by connecting all of the voting spindles assigned to candidates running for the same office to one interlock so that the casting of a vote for any one of said candidates will immobilize all of the voting spindles connected to said interlock. See FIGS. 27, 28 of Shoup Patent No. 2,054,102. In order to make it impossible to use the mechanical voting facilities of the present machine to cast a vote for a candidate for whom a write-in vote has already been cast, and vice versa, the machine of the present invention is provided with an interlocking mechanism which is shown in FIGS. 5, 6, 13 to 16, and 22. This mechanism includes levers 72, 74, 76, etc., which are pivoted on rod 34 with their free ends E movable in horizontal slots 80 formed in wall 12 inwardly, or to the right of, openings X as viewed in FIGS. 5 and 8. It will be understood that there is one lever for each cover C, and, as best shown in FIGS. 13, 14 and 15, each slot 80 ends in a depressed recess 82. By this arrangement, when a cover C is moved to the right, as viewed in FIGS. 5, 8 and 13 to 16, the free end E of lever 72, for example, will be engaged by shoulder 84 on the underside of cover C and will be moved in slot 80 until its free end falls in recess 82, as best shown in FIGS. 15 and 16. In this position, the lever will be out of the path of movement of the cover so that, return movement of the cover, or its movement to the left, as viewed in FIGS. 8, 9, 13, 14, 15 and 16, will not move the corresponding lever which will remain in the position illustrated in FIG. 16. The significance of this position will be best appreciated from FIG. 5 from which it will be seen that movement of lever 76, for example, until its free end E enters corresponding recess 82, rotates said lever in clockwise direction about rod 34, thus causing the other end 86 of said lever to move from the solid, to the broken, line position of FIG. 5 so as to pull link 88 to the left. Link 86 is connected to link 88 which is connected to strap 90 which, in turn, is connected to pull strap 92 which is wedged in interlock 94 which corresponds to the interlock shown in FIG. 27 of Shoup Patent No. 2,054,102. Therefore, if a cover C is moved out of registration with its opening to permit the casting of a personal choice vote, it will move lever 76 to the broken line position of FIG. 5 and therefore pull straps 92 and 96 to the left to immobilize the remaining straps in interlock 94 of FIG. 5. It will be noted that pull strap 96 is also connected to a voting spindle S–1 which is adapted to be turned by voting key or handle K and that rotation of spindle S will also pull strap 96 to the left in FIG. 5 and will also immobilize the remaining straps in interlock 94. In other words, and assuming that spindle S–1 and the particular cover C shown in FIG. 5 to be assigned to the same candidate, it follows that a voter must either turn the voting spindle to vote for the candidate listed on the ballot, or he must move the ballot cover to vote for a personal choice and that, having voted by using the spindle, he cannot move the cover, and vice versa.

This is due to the fact that the free end E of lever 76 falls into corresponding recess 82 and cannot be restored by return movement of the corresponding cover, and, therefore, the voter cannot expose the paper, write in the name of a candidate, restore the parts to their original position and then vote for the same, or for some other candidate by turning a voting spindle assigned to the same office. In other words, once he has moved a cover C and lever 76 in the manner described, the voter must use the write-in facility or lose his vote because, as stated, moving the cover and lever 76 in the manner described, immobilizes the corresponding mechanical voting facilities until lever 76 is restored to its original position in the manner hereinafter explained.

The manner in which covers C' and levers 72', 74' and 76', of personal choice column 10', operate is exemplified in FIG. 6 from which it will be seen that lever 76' is fulcrumed at its end at rod 34' and that, at its center, it is connected to strap 88', which corresponds to strap 88. By this arrangement movement of a cover C' to the left, as viewed in FIG. 6 rotates lever 76' in counterclockwise direction and thus pushes strap 88' in the direction of arrow 91, which in turn pulls strap 96' which corresponds to strap 96 in FIG. 5, outwardly of interlock 94' which corresponds to interlock 94 of FIG. 5 to immobilize the remaining straps in interlock 94' in the manner above described. In FIG. 6 voting spindle S–1 is connected to strap 96' by strap 92a which corresponds to strap 92 and by means of pin 98 which carries strap 96a.

For convenience, each cover C is provided with a pin 99 which moves in a slot 100 formed in the adjacent portion of wall 12 of the machine to guide the cover in its horizontal movement and prevent binding as the cover moves between the positions of FIGS. 8 and 9.

In a declared, or in a selective, primary election, the use by a voter of a voting spindle in a column assigned to one party automatically indicates the party to which the voter belongs and, in order to indicate the party to which a voter who has used the personal choice facilities belongs, it is necessary to provide one mechanism for use in a declared primary election, and another mechanism for use in a selective primary election.

Figure 2:
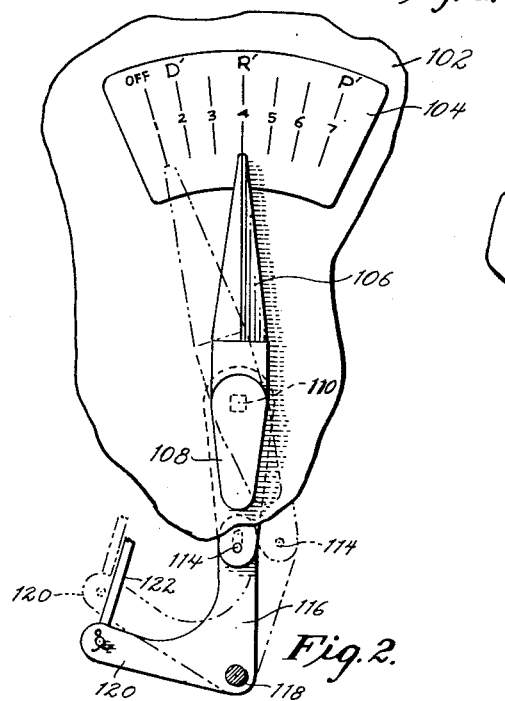
FIG. 2 is an enlarged fragmentary elevational view looking in the direction of line 2—2 on FIG. 1.
Figure 3:
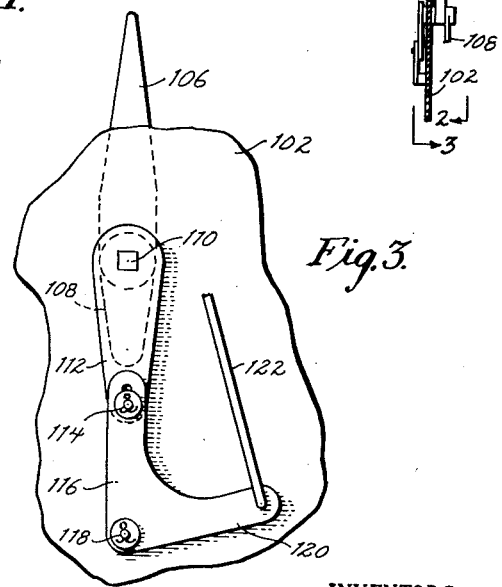
FIG. 3 is an enlarged fragmentary elevational view looking in the direction of line 3—3 on FIG. 1.

The mechanism for use in a "declared" primary election is best shown in FIGS. 2, 3 and 4–A, from which it will be seen that the end wall 102 of the machine is provided with an index plate 104 which carries various letters to designate the various parties, such as D for Democrat, R for Republican and P for Prohibitionist, etc. Co-acting with index plate 104 is a pointer 106 which is selectively movable, by the election officer, into registration with letter R when a voter declares that he is a Republican, and into registration with letter D when the voter is a Democrat, and so on. Pointer 106 is moved by handle 108 which is mounted on a square shaft 110 which passes through end wall 102 of the machine and the inner end of which carries a pendent extension 112. The lower end of extension 112 is pivoted at 114 to one end of a bell crank 116, which is pivoted to a fixed support at 118 and the other end 120 of which carries a rod or link 122 which, as best shown in FIGS. 4–A and 22, is connected to one end 124 of a U-shaped bracket 126 which is pivoted for rotation about pin 128. The other end 130 of bracket 126 is connected to one end of a bail 132, the other end of which is connected to bracket 68 which carries pricker 70. By this arrangement, vertical movement of rod 122 will rotate bracket 126 and will raise, or lower, bracket 68 on rod 64 according to the direction of movement of rod 122. By reference to FIGS. 8, 9, 10 and 11, it will be seen that plate 12 is bent to form extension 134, the lower portion of which is provided with a number of openings, one of which is marked RR, another of which is marked DD and another of which is marked PP, etc., to correspond to positions R, D and P, etc. on index plate 104 in FIG. 2. It will be noted that the vertical spacing of said openings, RR, DD, PP, relative to positions R', D', P', is such that, when the pointer 106 registers with letter R in FIG. 2, pricker 70 will be raised to register with opening RR, in FIGS. 10 and 11 and will puncture the paper at that level, and so that, when the pointer is moved to register with letter D in FIG. 2, the pricker will be lowered to register with opening DD to puncture the paper at the lower level, and so on. By pre-arrangement, the paper itself is marked with corresponding letters, or it is assumed that the central perforations indicate Republican votes and that the lowest perforations indicate Democratic votes and so on.

The mechanism for identifying the party of a voter using the write-in facilities of the machine in a "selective" primary election, is best shown in FIGS. 4 and 22 and includes bell crank levers 140, 142, etc., which are pivoted at 143 and which, in the position of FIG. 4, overlie pins 144 which are carried by the lower ends of spindle, or handle-return, members M–1, M–2. In FIG. 4 only two bell cranks and two spindle return members are shown, but it will be understood that an average voting machine will have about ten spindle return members and that there is a bell crank for each spindle return member.

As best shown in FIGS. 4, 19 and 22, bell crank 140 is connected by rod 146 to slide 148 and bell crank 142 is connected by rod 150 to slide 152. By this arrangement, when a voting spindle S–1 is turned in vote casting direction and moves spindle return member M–1 and bell crank 140 to the position shown in FIG. 4–B, rod 146 will move slide 148 to the left, as viewed in FIGS. 4, 19 and 22. This movement of rod 146 causes slide 148 to engage, and move, pin 154, which is mounted for rotation about fixed pin 158, to the left, as viewed in FIGS. 4, 19 and 22. Connected to pin 154 is a rod 160 which is also connected to previously mentioned bell crank 124. Therefore, movement of slide 148 to the left in FIGS. 4, 19 and 22, rotates bell crank lever 124 and bracket 126 in a direction to raise bail 132, bracket 68 and pricker 70 relative to rod 64, and vice versa.

Pin 154 is also connected by rod 160' to an oppositely arranged bell crank lever 124' which rotates bracket 126' to raise bail 132' and bracket 68' and pricker 70' relative to rod 64' and, hence, relative to the paper ballot P' on spool 16' of personal choice column 10'. In other words, except for opposite rotation, the parts which raise and lower pricker 70' are the same as those which raise and lower pricker 70.

By inspection of FIGS. 17 to 21, it will be seen that the slides 148 and 152 (and all the other slides), are horizontally staggered so that the uppermost slide 152, for example, is farther away from pin 154 than central slide 148. This means that slide 152 has to move a relatively long distance before it engages, and begins to move, pin 154, and, therefore, the pin will only be moved to the left a relatively small distance which is equal to the residual movement of slide 152. Slide 148 being nearer to pin 154, has to move through a relatively shorter distance before encountering, and beginning to move pin 154, and, therefore, the pin will be moved through a relatively great distance which is equal to the residual movement of the slide. But, because the upward movement of spindle return members M-1, M-2 and the rotary movement of their bell cranks are the same, it follows that slide 152, which must move through a relatively long distance before it engages pin 154, will move the pin through a relatively short distance while slide 148, which is nearer pin 154 than slide 152, has to move through a relatively shorter distance before it engages pin 154 and, therefore, slide 148 will move pin 154 through a greater distance. Therefore, the distance through which pin 154 is moved, and, hence, the extent to which pricker 70 (or 70') is raised, will be a function of the distance of the activating slide from the pin. Since the various spindle return members are assigned to various parties, it follows that the extent to which the prickers 70 and 70' are raised, will indicate to which party the voter who used a voting spindle associated with a spindle return member belongs.

By inspection of FIGS. 10 and 11, it will be seen that openings DD, RR and PP which correspond to the positions D, P, R on index plate 104, are vertically spaced and that pricker 70 has access to the paper only through one or another of said openings. Therefore, if a voter uses a spindle associated with return member M-2 to actuate slide 152, which is relatively remote from pin 154, pricker 70 will be raised only far enough to register with the lowermost opening DD to perforate the paper at that level and, if the spindles associated with return member M-2 have been assigned to the Democratic party, the perforation of the paper at the level of opening DD, will indicate that the voter is, or elected to vote for, a Democrat. If a voter uses a voting spindle associated with return member M-1 to move slide 148, pricker 70 will be raised high enough to register with opening RR and, if the voting spindle associated with spindle return member M-2 is assigned to the Republican party, the perforation of the paper through opening RR will indicate that the voter is, or elected to vote for, a candidate of the Republican party. For a more complete disclosure of the structure and operation of bell cranks 140, 142, etc., and slides 148, 152, etc., reference may be had to co-pending Shoup et al. application, Serial No. 852,135, filed November 10, 1959, entitled Party Selecting Mechanism for Voting Machine. For the purpose of the present invention, it is only necessary to note that the use of voting spindles to move slides which are at different distances relative to pin 154 will move the pin to different extents and will, therefore, raise pricker 70 and pricker 70' to different heights relative to the paper on spools 16 and 16'. It is understood that, when handle 106 is moved to its "off" position, pricker 70 will assume a position below lowermost opening DD, as shown in broken lines in FIG. 10, so that it will be out of touch with ballot paper P until a voter actually casts a vote.

It was previously explained that levers 62, 74, 76, etc., are moved from the solid to the broken line position of FIG. 5 by the movement of the corresponding cover C from the position of FIG. 8 to the position of FIG. 9 and that they cannot be moved back by the return movement of the covers. It was also previously explained that lever 36 is operative to rotate gear 26 only during its return movement from the position of FIG. 9 to the position of FIG. 8. In order to return lever 36 from the position of FIG. 9 to the position of FIG. 8 to rotate spool 16 and to engage the pricker with the paper, and in order to restore levers 72, 74, 76, etc., from the broken, to the solid line, position of FIG. 5, rod R, FIGS. 4 and 22, is provided with wings 164 and 164' which engage the adjacent ends of bell cranks 166 and 166' which are pivoted at 167 and are connected to rods 168 and 168'. It will be remembered that, when the voting is completed and the curtain is opened, rod R moves downwardly from its position in FIG. 4, thus causing wing 164 to rotate bell crank 166 in clockwise direction and causing wing 164' to rotate bell crank 166' in counterclockwise direction, as viewed in FIG. 4. Rotation of bell crank 166 in clockwise direction moves bar 168 which, as best shown in FIG. 4-A, is connected by pin 170 and plate 172 to lever 36, thus moving vertical extension arm 48 of lever 36 to the left in FIGS. 4, 5 and 9 to engage and restore any lever 72, 74 or 76, and corresponding cover C, from the position of FIGS. 5 and 9 to the position of FIG. 8. Counterclockwise rotation of bell crank 166' likewise moves bar 168' to the right in FIG. 4, and, since bar 168' is connected by means of pin 170' and plate 172', which correspond to previously described pin 170 and plate 172, to lever 36', vertical extension 48' of right hand lever 36' which corresponds to lever 36, will be moved to the right in FIGS. 4 and 22 to push back any cover C' or any lever 72', 74' or 76' of personal choice column 10' which may have been moved to the left, during the casting of a write-in vote in personal choice column 10'.

In order to facilitate removal of spool 16 (or 16') on which the paper perforated by pricker 70 (or 70') has been wound, each spool is mounted on a cam 174, FIG. 12, whereby rotation of the cam raises the bottom end of the spool out of engagement with the square end 24 of shaft 22 whereupon the spool can be pulled out and the paper connecting it to its corresponding feed spool 14 or 14' severed. Cam 174 is rotated by a handle 176, FIG. 5, which is accessible from the rear of the machine.

In order to insure smooth operation, the mechanism for returning arms 48 and levers 72, etc., which is shown in the lower portion of FIGS. 4 and 22 is preferably duplicated at the upper end of the voting machine. Since this duplication can be carried out by those skilled in the art by merely reversing, or re-orienting various parts, it is thought unnecessary to describe the same in detail. Instead, the upper end of rod R, wings 164, 164', bell crank 166, 166' and rods 168, 168', are shown to indicate where and how the various parts are mounted. Since, as shown in Shoup Patent No. 2,826,365, the curtain cannot be opened unless the voter has turned at least one voting spindle to vote casting position, and since the turning of said one voting spindle moves the pricker to a predetermined position, the party to which the voter belongs, will be indicated by the particular spindle used.

What we claim is:

1. A voting machine including
   a plurality of sets of mechanical vote-casting facilities assignable, respectively, to a plurality of political parties, and
   an auxiliary voting mechanism for use in voting for candidates not sponsored by any of said parties,
   said auxiliary voting mechanism including
   a ballot on which the names of such candidates may be written,
   a cover movable to a first position in which said ballot is concealed thereby and to a second position in which said ballot is exposed,
   a marker movable to a first position in which it is out of engagement with said ballot and
   to a second position in which it engages and marks said ballot, a first actuating means for moving said marker to a number of predetermined positions relative to said ballot, which positions are correlated to said parties, and a second actuating means operable by movement of said cover between its first and second positions to bring said marker into engagement with said ballot, whereby the position of the mark made on the ballot indicates the party to which the voter using the auxiliary voting mechanism belongs.

2. The structure recited in claim 1 and resetting means for returning said cover to its first position.

3. The structure recited in claim 2 in which the voting machine includes a closure which is movable to a closed, or to an open, position, and in which the resetting means is operated upon movement of said closure to its open position.

4. The structure recited in claim 2 and ballot-moving means operable by movement of said resetting means for moving said ballot transversely of the marker to present a new portion of said ballot to said marker.

5. For use with a voting machine of the type which includes:

a plurality of columns of voting spindles assignable for use by the voters of a plurality of political parties, a spindle-return member operatively associated with said columns of spindles, respectively, said spindle-return members being movable in one direction and to the same extent, by the rotation of any voting spindle in an associated voting column, said return members being movable in the opposite direction to re-set said spindles, a ballot for receiving the names of candidates to whom no voting spindles are assigned, means for indicating the party affiliation of a voter using said ballot, said means including a marker movable to predetermined positions relative to said ballot, a plurality of first actuating means operatively connecting each of said spindle-return members to said marker, and operative, on movement of a spindle-return member in said one direction, to move said marker to one of said predetermined positions relative to said ballot, which position is correlated with one of said parties, actuating means for moving said marker into and out of marking engagement with said ballot at said predetermined position, and a cover movable to a first position in which the ballot is concealed and to a second position in which said ballot is exposed, said actuating means being activated by movement of said cover between its first and second positions.

6. The structure recited in claim 5 and a curtain, curtain opening and closing means, and means operable upon opening of said curtain for moving said cover from its second to its first position and for moving said ballot transversely of said marker.

7. A voting machine including at least one column of voting spindles, an interlock, a plurality of straps connected to said spindles and movably engaging said interlock in such a manner that, outward movement of any one of said straps relative to said interlock immobilizes the remaining straps and the spindles connected thereto, a personal choice ballot, a plurality of covers associated with corresponding portions of said ballot, each of said covers being movable to a first position, in which the corresponding portion of said ballot is concealed, and to a second position in which said portion of said ballot is exposed, a plurality of bell crank levers disposed in the paths of movement of said covers, respectively, whereby, movement of any of said covers to its second position moves the corresponding bell crank lever in one direction, said bell crank levers being unconnected to said covers whereby movement of said covers to their first positions does not move said bell crank levers in the opposite direction, links connecting said bell crank levers to said pull straps in such a fashion that, movement of any bell crank lever, in said one direction, in response to movement of its corresponding cover to its second position, moves the corresponding pull strap outwardly relative to said interlock to immobilize the remaining pull strap and corresponding voting spindles, a curtain movable to a closed and to an open position, actuating means for opening and closing said curtain, a lever engageable with any cover which may have been moved to its second position, and with the corresponding bell crank levers, and restoring means operable by movement of said actuating means in curtain opening direction and engageable with said lever for moving said cover to its first position and for simultaneously moving the corresponding bell crank lever in the opposite direction to move the corresponding pull strap inwardly of said interlock.

8. The structure recited in claim 7 and means operable by movement of said actuating means in curtain-opening direction for moving said ballot relative to said covers.

9. The structure recited in claim 7 and a marker and means actuated by movement of any of said covers between its first and second positions for bringing said marker into, and out of, engagement with said ballot.

References Cited in the file of this patent
UNITED STATES PATENTS

| | | |
|---|---|---|
| 1,194,337 | Lausterer | Aug. 8, 1916 |
| 2,756,822 | Jones | July 31, 1956 |